W. H. SAUVAGE.
SLACK ADJUSTER.
APPLICATION FILED JAN. 31, 1918.
1,298,572.
Patented Mar. 25, 1919.
3 SHEETS—SHEET 1.
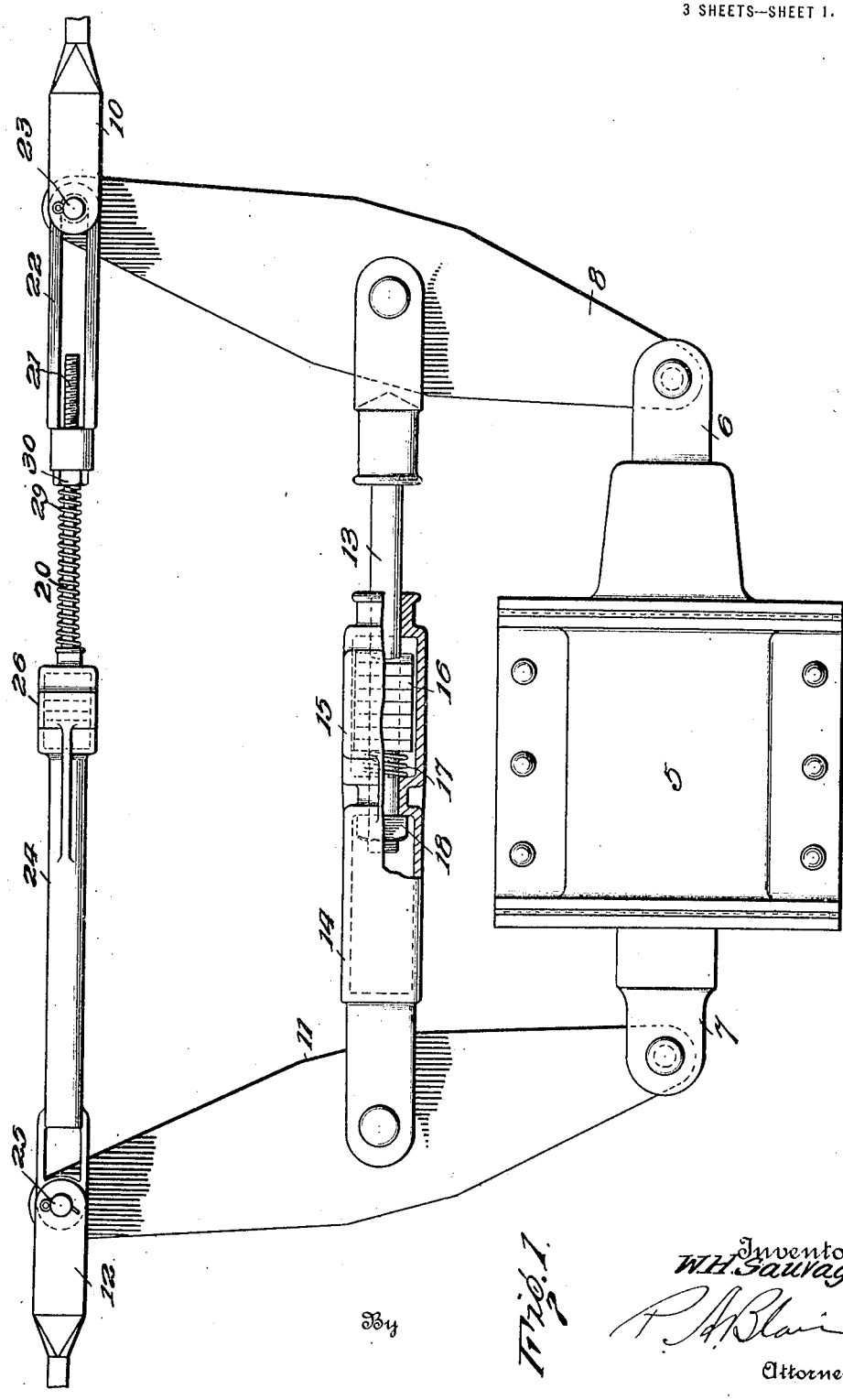
Inventor
W. H. Sauvage
By
Attorney

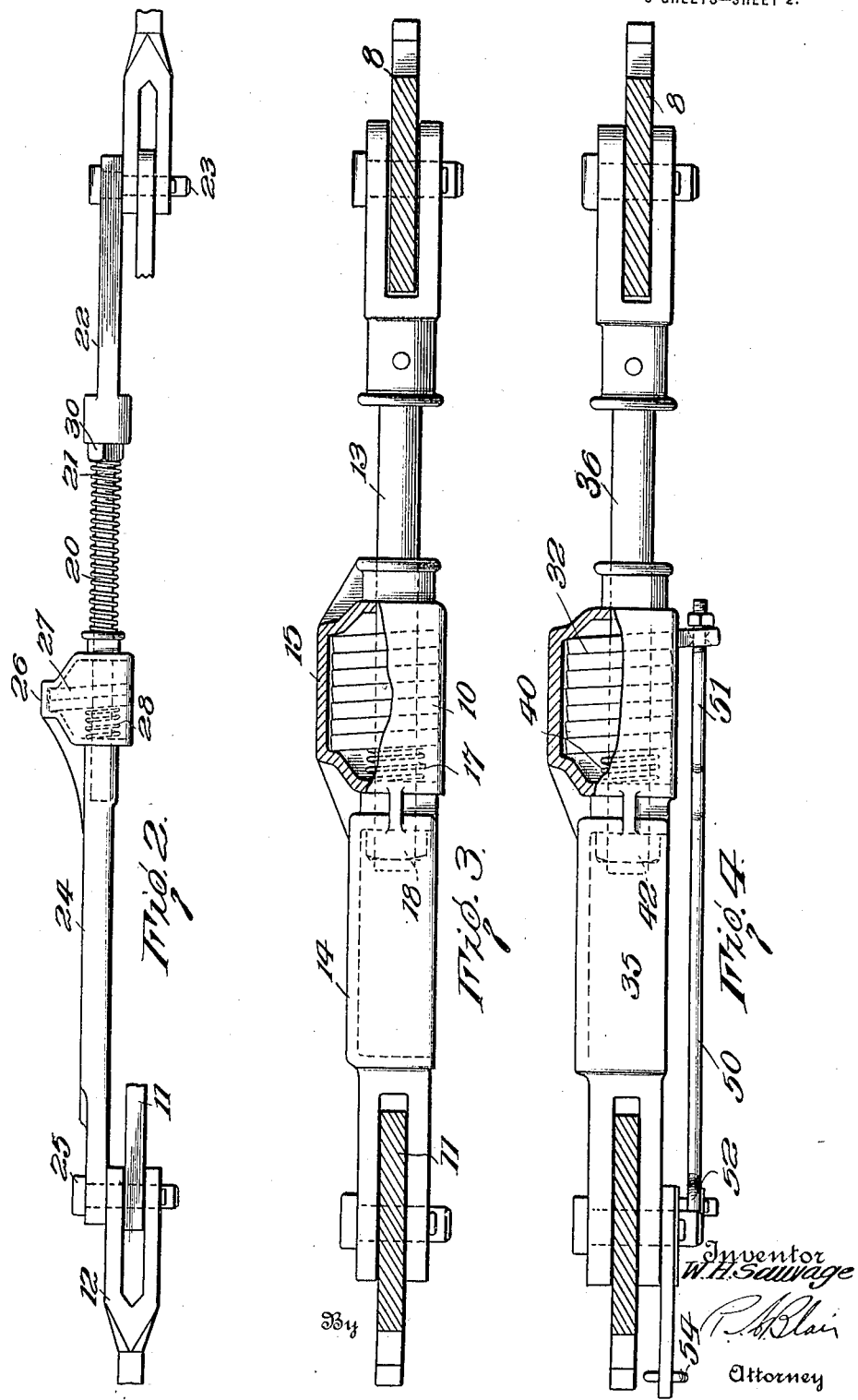

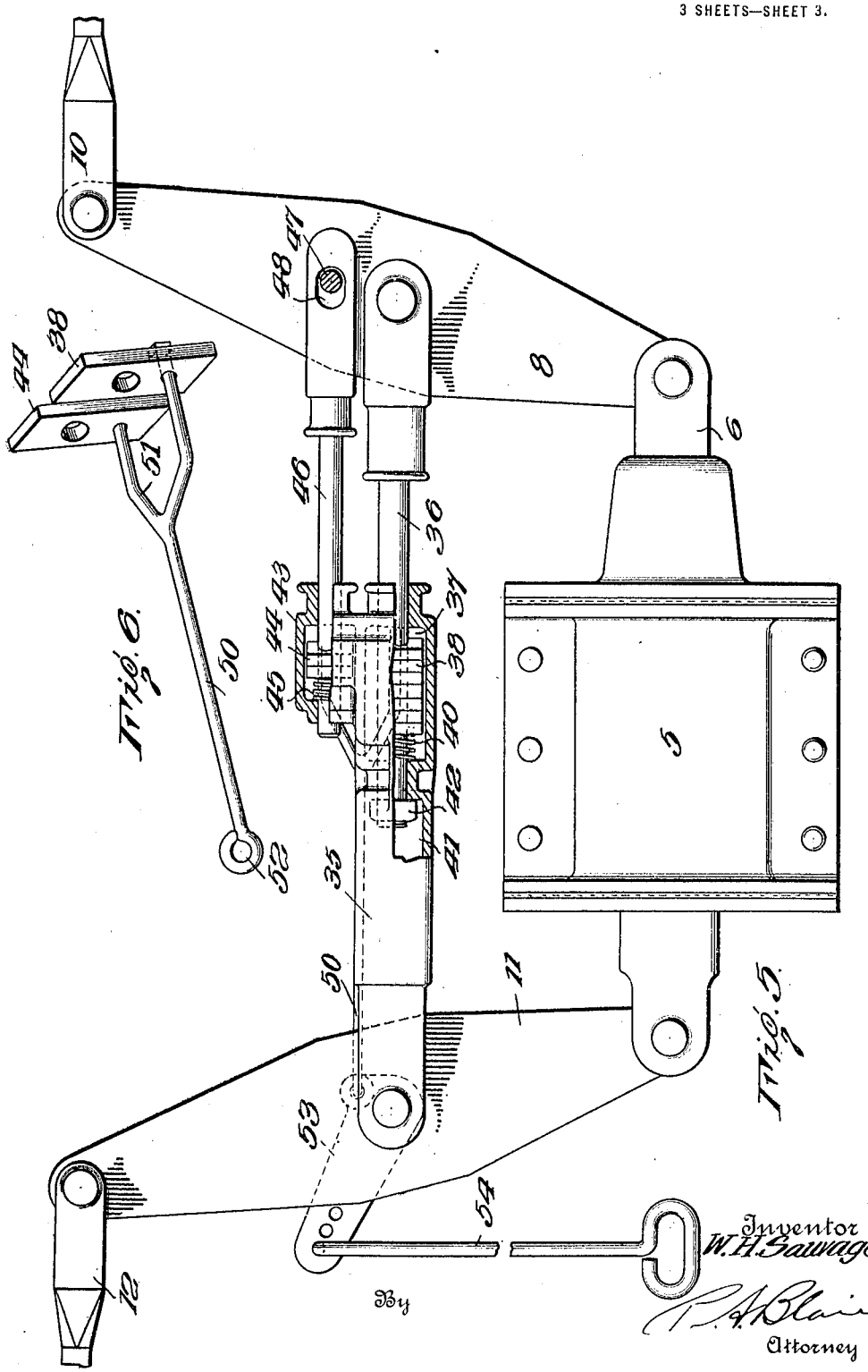

UNITED STATES PATENT OFFICE.

WILLIAM H. SAUVAGE, OF FLUSHING, NEW YORK, ASSIGNOR, BY MESNE ASSIGNMENTS, TO GOULD COUPLER COMPANY, OF NEW YORK, N. Y.

SLACK-ADJUSTER.

1,298,572.  Specification of Letters Patent.  Patented Mar. 25, 1919.

Application filed January 31, 1918. Serial No. 214,685.

*To all whom it may concern:*

Be it known that I, WILLIAM H. SAUVAGE, a citizen of the United States of America, residing at Flushing, Long Island, in the county of Queens and State of New York, have invented certain new and useful Improvements in Slack-Adjusters, of which the following is a specification.

This invention relates to slack adjusters particularly adapted to take up the slack in the foundation brake rigging due to wear of the parts. While the invention will be hereinafter described with relation to its application to the brake mechanism adjacent the main power cylinder, it is to be understood that various features thereof are equally adaptable to other parts of the brake rigging.

One of the main objects of the present invention is to provide an automatic slack adjuster particularly adapted for use in connection with the foundation brake rigging having relatively few parts which will be comparatively inexpensive to manufacture. Another object is to provide a slack adjuster of the above general character which may be applied to brake rigging now in general use without materially changing the parts now constituting such mechanism. A further object is to provide a simple and practical automatic slack adjuster designed to reliably and efficiently take up the slack in the brake rigging due to wear of the parts and provide uniform piston travel. A further object is to provide a slack adjuster designed to take up all of the slack in the rigging after applying new brake shoes or other parts, and to automatically set or adjust itself to the desired degree of efficiency and operation on the first application of the brakes thereafter.

Other objects will be in part obvious from the annexed drawings and in part indicated in connection therewith by the following analysis of this invention.

This invention accordingly consists in the several steps and the relation of each step to each of several of the others, both individually and in combination; all as more completely outlined herein.

To enable others skilled in the art so fully to comprehend the underlying features thereof that they may embody the same by the numerous modifications in structure and relation contemplated by this invention, drawings depicting several desired forms of the apparatus have been annexed as a part of this disclosure, and in such drawings, like characters of reference denote corresponding parts throughout all the views, of which:

Figure 1 is a plan view of the complete mechanism and such parts of the foundation brake rigging as are necessary to understand the present invention.

Fig. 2 is an elevational view partly in section showing the adjusting mechanism.

Fig. 3 is an elevational view partly in section showing the pull rod and permanent take up and holding mechanism.

Fig. 4 is a side elevational view partly in section showing a release mechanism applied to the take up and holding mechanism.

Fig. 5 is a plan view showing a modified form of slack adjuster.

Fig. 6 is a detail perspective view of a part of the dog release mechanism.

Referring now to the drawings in detail and more particularly Fig. 1, 5 denotes a power cylinder of general construction adapted to be supported beneath the body of the car. This cylinder is provided with the usual piston and piston rod 6 projecting at one side thereof and a supporting member 7 at the opposite side. The piston rod is connected with one end of a live lever 8, the opposite end of which is connected to a pull rod 10 leading to the truck brake rigging at one end of the car. A coöperating dead lever 11 is similarly connected to the support at one end and a pull rod 12 at its other end leading to the brake rigging at the opposite end of the car.

Between the central parts of the live and dead levers is positioned a normally nonextensible connecting rod comprising a solid member 13 and a tubular casing 14 which it is adapted to telescope. The casing is provided at one end with a housing 15 within which are mounted a plurality of rectangular gripping or holding dogs 16 having central holes with case hardened edges through which the rod 13 is adapted to pass. These dogs are normally held in canted position, as shown in Fig. 3 by means of a spring 17 reacting against the end of the housing. A nut 18 is preferably threaded on the end of the rod 13 adapted to prevent removal thereof from the casing 15.

An adjusting rod coacts with this take up rod and comprises a member 20 having an adjustable threaded connection 21 with a loop 22 coacting with a shouldered pin 23 forming a pivotal connection between the live lever 8 and the pull rod 10. This adjusting rod 20 coacts with an adjusting rod casing 24 pivotally connected at 25 with the same pivot that connects the dead lever 11 with the pull rod 12. The casing is provided with a housing 26 within which are a plurality of gripping dogs 27 similar to the dogs 16 and normally held in canted position by a spring 28 as shown clearly in Fig. 2. This construction, located at the extreme ends of the live and dead levers is such as will permit an inward movement of the rod 20 with respect to its casing but positively prevents an outward movement thereof. Any desired yielding means, as a spring 29, may be interposed between the housing 26 and connection 22 to prevent accidental or unintentional telescopic movement of the associated parts.

The operation of the device is substantially as follows: On application of the brakes the piston 6 moves outwardly carrying the adjacent end of the live lever therewith. This causes an opposite movement of the other end of the lever, thereby pulling the rod 10 toward the left. A reaction, however, occurs through the two-part take-up rod to equalize the force exerted, causing a corresponding movement of the pull rod 12 towards the right, thus taking up the slack of the truck brake rigging and applying the brakes.

The piston travel is regulated by the threaded connection 21 and is locked in adjusted position by means of lock nut 30 thereon, it being understood that the pivot pin 23 is free to travel along the slot 22 until it engages the end of the adjusting rod 20. If any excess travel of the piston rod occurs, no matter how slight, beyond that predetermined amount allowed for by the slot 22 the adjusting rod 20 will be forced inwardly with respect to the casing 24 through the holding dogs 27 a corresponding amount.

On release of the brakes the piston 6 moves inwardly carrying the pin 23 to the right hand end of the slot 22. Further movement is then arrested and this point 23 acts as a fulcrum to cause the pivotal connection between the live lever and the rod 13 to move relatively toward the left, thus causing an inward telescopic action between the rod 13 and its casing 14.

An examination of Fig. 3 will show that this rod 13 is free to move inwardly with respect to the dogs 10 but they will positively grip and hold the rod and prevent outward movement thereof on a subsequent application of the brakes unless released. This operation is repeated from time to time as wear of the parts occurs. When new parts, particularly, brake shoes, are to be applied or other alteration made to take up the slack, both sets of gripping dogs are released by moving the same to a position at right angles to the axis of the coacting rods, thus permitting the rods to be withdrawn to their original position, as shown in Fig. 4. An application of the brakes will automatically bring the parts to adjusted position in a single operation.

In the modification shown in Fig. 5, substantially the same arrangement of power levers, cylinders and connections are shown, but the permanent take up and holding mechanism, as well as the adjusting rod mechanism or temporary take up is somewhat different. In this construction, a telescopic push rod extends between the central parts of the live and dead levers, and comprises a tubular member 35 and connected with the dead lever and a solid member 36 pivotally connected with the live lever and telescoping therewith. The tubular member is provided with two chambers, one of which 37 contains a plurality of holding dogs 38 normally held in canted position by means of spring 40 surrounding the push rod 36. The other chamber 41 receives the end of the push rod 36 upon which is threaded a nut 42 to prevent its withdrawal.

It will be noted that the tubular member 35 is provided with an auxiliary housing 43 integrally formed therewith and containing a plurality of dogs 44 held in canted position by means of a spring 45. An adjusting rod 46 passes through this auxiliary housing 43 and has its opposite end pivotally connected at 47 with the live lever 8. This pivotal connection includes a lost motion slot 48 for insuring brake shoe clearance and uniform piston travel before actuating temporary take up mechinism.

It will thus be seen that when the brake cylinder is actuated the lower end of the live lever 8 moves outwardly and reacts through the telescopic push rod to apply the brakes, as previously described. If excess movement takes place the pivot pin 47 coacts with the end of the slot 48 and moves the adjusting rod 46 inwardly or towards the left with respect to the holding dogs 44, thereby to register this excess slack. On release of the brakes the piston returns to normal position and when the pin 47 reaches the right hand end of the slot 48 it will act as a stop and cause the telescopic rod 36 to move inwardly with respect to the tubular member 35 against the action of the dogs, thereby permanently taking up and holding the excess slack registered by the temporary take up and holding means.

In Fig. 6, there is shown a release mechanism for the dogs, which with slight modification may be applied to the forms shown in Figs. 1, 2 and 3. It comprises a rod 50 positioned substantially parallel to the tubular member 35 provided with a bifurcated end 51 connected with two of the dogs 38 and 44 which are made slightly longer than the other. The opposite end of the rod 52 is connected to a bell crank lever 53, the opposite arm of which is connected by means of a rod 54 extending to the side of the car. It will thus be seen that when the pull rod 54 is acutated the link or member 50 is moved relatively toward the left, thereby straightening the dogs 38 and 44 which will permit the adjusting rod and take up rods 36 and 46, respectively, to be moved relatively thereto in a direction opposite to their normal telescopic movement.

It is thus seen that the present invention which is particularly adapted for the foundation brake rigging is of such construction as to permit its application to the rigging now in use without material change. The connection including the permanent take up and holding mechanism may be easily substituted for the push rod now in use and the adjusting rod and a temporary taking up and holding mechanism associated therewith may be readily applied by merely substituting longer pivot pins 23 and 25 at the points as needed. Both devices are practical, reliable and efficient in use and operation and are believed to accomplish, among others, all of the objects and advantages herein set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In a slack adjuster, in combination with a power cylinder having a piston adapted to be centrally disposed beneath the car floor, a dead lever connected with one end of the cylinder, a live lever connected with a piston at one end, a telescopic push rod connecting the central parts of the live and dead levers including a housing and a member telescoping therewith and a plurality of spring held dogs within the housing adapted to permanently take up the slack, and temporary take up and holding mechanism parallel to said push rod including a housing and a rod connected with the live lever telescoping with the housing, a plurality of spring held holding dogs within the housing coacting with the rod, said adjusting rod having a lost motion connection with the live lever adapted to insure uniform brake shoe clearance.

2. In a slack adjuster, in combination, a power cylinder having a piston, live and dead levers at opposite ends thereof and connected therewith, an extensible rod connecting the central parts of said levers, a telescopic adjusting rod connecting the free ends of said levers having a lost motion connection at one point adapted to provide for normal piston travel, and means associated with said lost motion connection permitting an adjustment of the piston travel.

3. In a slack adjuster, in combination, a power cylinder, live and dead levers at opposite ends thereof and connected therewith, a telescopic rod connecting the central parts of said levers, an adjusting rod connecting said levers, permanent take up and holding mechanism between the effective ends of the parts of the telescopic rod, temporary take up and holding mechanism between the effective ends of the parts of the adjusting rod, and means associated with one of the parts permitting a predetermined piston travel prior to the actuation of either of said take up mechanisms, said temporary and permanent take up and holding mechanisms each comprising an inclosing housing and a plurality of resiliently held dogs within said housing.

4. In a slack adjuster, in combination, a power cylinder, live and dead levers at opposite sides thereof and connected therewith, a telescopic rod connecting the central parts of said levers, an adjusting rod connecting said levers, permanent take up and holding mechanism between the effective ends of the parts of said first rod, temporary take up and holding mechanism between the effective ends of the parts of the adjusting rod, means associated with one of the parts of said adjusting rod permitting a predetermined piston travel prior to the actuation of either of said take up mechanisms, and means associated with said last mentioned means adapted to regulate the piston travel.

5. In a slack adjuster, in combination, a power cylinder having a piston, live and dead levers connected therewith at opposite sides thereof, a telescopic rod connecting the central parts of the levers, pull rods at the free ends of said levers leading to the truck brake rigging, a telescopic adjusting rod connecting the live and dead levers at their points of connection with respective pull rods, one of said connections including an adjustable lost motion slot, permanent take up and holding mechanism associated with the first rod, and temporary take up and holding mechanism associated with the adjusting rod.

6. In a slack adjuster, in combination, a power cylinder having a piston, live and dead levers connected therewith at opposite sides thereof, a telescopic rod connecting the central parts of the levers, pull rods at the free ends of said levers leading to the truck brake rigging, a telescopic adjusting rod connecting the live and dead levers at their points of connection with respective pull rods, one of said connections including an adjustable lost motion slot, permanent take up and holding mechanism associated with the first rod, temporary take up and holding mechanism associated with the adjusting rod, both the holding rod and the adjusting rod comprising a casing, a rod telescoping within said casing, and means adapted to permit normal movement thereof only in one direction.

7. In a slack adjuster, in combination, a power cylinder having a piston, live and dead levers connected at the opposite sides thereof, a telescopic push rod connecting the central parts of the levers, pull rods connected with the free ends of the levers leading to the respective truck brake rigging, and an adjusting means having an adjustable lost motion connection between pull rods comprising a rod, a casing having an inclosing housing with which said rod telescopes and holding means within said housing coacting with the rod.

8. In a slack adjuster, in combination, a power cylinder having a piston, live and dead levers connected at the opposite sides thereof, a telescopic push rod connecting the central parts of the levers, pull rods connected with the free ends of the levers leading to the respective truck brake rigging, and an adjusting means connected between said pull rods and comprising a rod, a casing with which said rod telescopes, and holding dogs housed against snow and dirt within the casing engaging the rod, one of the parts of said adjusting rod being provided with an adjustable lost motion device adapted to permit desired piston travel prior to the actuation of the slack adjuster mechanism.

9. In a slack adjuster, in combination, a power cylinder having a piston, live and dead levers connected at the opposite sides thereof, a telescopic push rod connecting the central parts of the levers, pull rods connected with the free ends of the levers leading to the truck brake rigging, an adjusting rod connected between said pull rods and comprising a rod, a casing with which said rod telescopes, and holding dogs within the casing engaging the rod, one of the parts of said adjusting rod being provided with a lost motion device adapted to permit uniform piston travel prior to the actuation of the slack adjuster mechanism, and means associated with said lost motion device permitting a variation and adjustment of the piston travel.

10. In a slack adjuster, in combination, a power cylinder having a piston, a fixed support at one end, a dead lever supported thereby, a live lever pivotally connected with the end of the piston, permanent take up and holding mechanism associated with one of said parts, and temporary take up and holding mechanism connecting said levers, said mechanisms each including a casing pivotally connected with one lever, a rod pivotally connected with the other lever, holding means protectively housed within each casing adapted to engage the rod, a lost motion device at one of the points of connection with the end of one of the levers, means for adjusting the lost motion thereby to regulate the piston travel, and means associated with said last mentioned parts adapted to lock the same in their adjusted positions.

11. In a slack adjuster, in combination, a source of power, live and dead levers connected therewith, telescopic mechanism between the central parts of said levers adapted to permanently take up the slack of the brake rigging, an adjusting mechanism parallel to said first mechanism for actuating the same, both of said mechanisms comprising an inclosing protective housing, a plurality of perforated holding dogs in each housing, spring means adapted to hold said dogs in canted relation and a rod passing through the perforations in said holding dogs, the rod associated with the adjusting mechanism having a lost motion connection with the lever to which it is attached thereby to insure predetermined brake shoe clearance, and means for adjusting said lost motion.

In testimony whereof I affix my signature in the presence of a witness.

WILLIAM H. SAUVAGE.

Witness:
G. H. DIETZ.

Copies of this patent may be obtained for five cents each, by addressing the "Commissioner of Patents, Washington, D. C."